United States Patent
Keller

(10) Patent No.: US 10,807,471 B2
(45) Date of Patent: Oct. 20, 2020

(54) METHOD FOR OPERATION AND INDUSTRIAL TRUCK

(71) Applicant: HUBTEX MASCHINENBAU GMBH & CO. KG, Fulda (DE)

(72) Inventor: Juergen Keller, Grossenlueder (DE)

(73) Assignee: HUBTEX MASCHINENBAU GMBH & CO. KG, Fulda (DE)

( * ) Notice: Subject to any disclaimer, the term of this patent is extended or adjusted under 35 U.S.C. 154(b) by 0 days.

(21) Appl. No.: 16/318,374

(22) PCT Filed: Jun. 27, 2017

(86) PCT No.: PCT/EP2017/065841
§ 371 (c)(1),
(2) Date: Jan. 17, 2019

(87) PCT Pub. No.: WO2018/015116
PCT Pub. Date: Jan. 25, 2018

(65) Prior Publication Data
US 2019/0283582 A1    Sep. 19, 2019

(30) Foreign Application Priority Data
Jul. 19, 2016   (DE) .................. 10 2016 113 260

(51) Int. Cl.
*B60K 31/00* (2006.01)
*B62D 7/15* (2006.01)
(Continued)

(52) U.S. Cl.
CPC .......... *B60K 31/0075* (2013.01); *B62D 7/142* (2013.01); *B62D 7/159* (2013.01);
(Continued)

(58) Field of Classification Search
CPC .. B60K 31/0075; B62D 7/1509; B62D 7/142; B62D 7/159; B62D 15/021; B62D 61/065; B66F 9/07568
See application file for complete search history.

(56) References Cited

U.S. PATENT DOCUMENTS 4,552,239 A * 11/1985 Kanazawa ........... B62D 7/1572
                                                    180/408
4,657,102 A *  4/1987 Kanazawa ........... B62D 7/1572
                                                    180/415
(Continued)

FOREIGN PATENT DOCUMENTS

DE   10 2008 052 514 A1   4/2010
DE   10 2012 112 743 A1   6/2014
(Continued)

OTHER PUBLICATIONS

Machine Translation of EP2508403A1, Oct. 10, 2012 (Year: 2012).*

*Primary Examiner* — Frederick M Brushaber
(74) *Attorney, Agent, or Firm* — Norman B. Thot

(57) ABSTRACT

A method for operating an industrial truck having three wheels. During longitudinal travel, two steerable wheels run in succession in a first lane, and a third wheel runs in a second lane. The third wheel initially runs on an inside during a turning in while cornering until the industrial truck, during a further turning in, transitions into a revolving motion. The method includes reducing a drive power as of a specific steering angle during the turning in prior to the revolving motion, and disengaging or reversing a direction of a drive rotation of the third wheel after a delay time which begins with the reducing of the drive power, or, continuously reducing the drive power from the specific steering angle during the further turning in, and disengaging or reversing
(Continued)

the direction of rotation of the third wheel when transitioning into the revolving motion.

6 Claims, 7 Drawing Sheets

(51) Int. Cl.
    *B62D 7/14*       (2006.01)
    *B62D 15/02*     (2006.01)
    *B62D 61/06*     (2006.01)
    *B66F 9/075*     (2006.01)

(52) U.S. Cl.
    CPC .......... *B62D 7/1509* (2013.01); *B62D 15/021* (2013.01); *B62D 61/065* (2013.01); *B66F 9/07568* (2013.01)

(56) References Cited

U.S. PATENT DOCUMENTS

| | | | | | |
|---|---|---|---|---|---|
| 5,060,743 | A | * | 10/1991 | Oda | B62D 7/1572 180/415 |
| 5,362,080 | A | * | 11/1994 | Bishop | B62D 6/00 180/415 |
| 5,489,005 | A | * | 2/1996 | Marcott | B62D 12/00 180/405 |
| 5,511,630 | A | * | 4/1996 | Kohata | B62D 5/0835 180/421 |
| 5,718,304 | A | * | 2/1998 | Lee | B62D 7/1572 180/415 |
| 5,862,878 | A | * | 1/1999 | Bohner | B62D 5/06 180/403 |
| 5,975,224 | A | * | 11/1999 | Satzler | B62D 9/00 180/6.3 |
| 6,076,627 | A | * | 6/2000 | Bohner | B62D 5/06 180/403 |
| 6,102,150 | A | * | 8/2000 | Bohner | B62D 5/30 180/403 |
| 6,227,328 | B1 | * | 5/2001 | Shimizu | B62D 5/065 180/421 |
| 6,354,393 | B1 | * | 3/2002 | Ahlert | B62D 5/06 180/403 |
| 6,450,285 | B1 | * | 9/2002 | Horwath | B62D 7/144 180/404 |
| 6,793,036 | B1 | * | 9/2004 | Enmeiji | B62D 7/1509 180/411 |
| 7,200,993 | B2 | * | 4/2007 | Khalil | B62D 5/09 60/403 |
| 7,389,848 | B2 | * | 6/2008 | Palmberg | B62D 5/0835 180/415 |
| 7,412,315 | B2 | * | 8/2008 | Wildey | B62D 12/00 180/235 |
| 7,631,722 | B2 | * | 12/2009 | Miyajima | B62D 5/0463 180/420 |
| 2004/0149498 | A1 | * | 8/2004 | Nakashima | B62D 11/24 180/6.24 |
| 2015/0353130 | A1 | * | 12/2015 | Keller | B62D 7/159 180/253 |

FOREIGN PATENT DOCUMENTS

| | | |
|---|---|---|
| DE | 10 2014 203 510 A1 | 8/2015 |
| DE | 10 2014 115 582 A1 | 4/2016 |
| EP | 2 508 403 A1 | 10/2012 |
| WO | WO 2011/113127 A1 | 9/2011 |

* cited by examiner

- ———— electric control line
- — — — hydraulic supply, steering
- — · — · — hydraulic supply, drive
- ············ control line, drive

METHOD FOR OPERATION AND INDUSTRIAL TRUCK

CROSS REFERENCE TO PRIOR APPLICATIONS

This application is a U.S. National Phase application under 35 U.S.C. § 371 of International Application No. PCT/EP2017/065841, filed on Jun. 27, 2017 and which claims benefit to German Patent Application No. 10 2016 113 260.8, filed on Jul. 19, 2016. The International Application was published in German on Jan. 25, 2018 as WO 2018/015116 A1 under PCT Article 21(2).

FIELD

The present invention relates to a method for operation and to an industrial truck with at least two drivable wheels running in different lanes when travelling longitudinally, of which at least one is steerable around steering angles and at least one initially runs on the inside during cornering until the industrial truck, during further cornering, transitions into a revolving motion.

BACKGROUND

Such a method for operation and such an industrial truck are described in DE 10 2012 112 743 A1. DE 10 2012 112 743 A1 describes an industrial truck with three wheels. All wheels are arranged around steering axes running approximately perpendicularly to the wheel axes and approximately parallel to one another. The industrial truck comprises the drive programs "longitudinal travel" and "lateral travel." A control unit is provided to switch between longitudinal travel and lateral travel oriented approximately perpendicularly thereto via which the steering devices respectively associated with the wheels can be acted on so that the wheels, during a neutral positioning of the steering element, for example, a steering wheel, are located in a straightforward position in the corresponding travel direction. All rotational axes of the steered wheels in this position run at least substantially parallel or congruently, in other words, the center of steering is located in infinity.

All wheels of this industrial truck are drivable via respectively associated drive devices. These drive devices may in particular be electrically or hydraulically powered motors.

When this industrial truck is in the travel program "longitudinal travel," two of its wheels run in succession and at least approximately in one and the same first lane. The third wheel runs in the second lane. Viewed from the direction of longitudinal travel, the third wheel is located approximately between the two wheels running in the first lane and is hence referred to as the "middle wheel."

When this industrial truck is in its lateral travel, the steering devices of the two wheels running in the first lane are steered according to the steering commands generated with the help of the steering element. The middle wheel is not steered.

When this industrial truck is steered from longitudinal travel into a cornering, the middle wheel is located on the inside of the curve so that its speed of rotation is reduced compared to the wheels on the outside of the curve. When turning in, the center of steering of the two wheels running in the first lane steadily approaches the steering axis of the middle wheel. The middle wheel must stop when the center of steering collides with its steering axis. When turning in further, i.e., when the center of steering moves between the middle wheel and the wheels running in the first lane so that the industrial truck rotates around a rotational axis located between the wheels, hence rotating in a "revolving motion," the middle wheel must ultimately rotate in the opposite direction. The drive of the at least one wheel initially running on the inside during cornering, for example, the middle wheel, is therefore disengaged when reaching a specific steering angle of the at least one steered wheel. The phrase "initially running on the inside during cornering" is meant to clarify that this wheel, when turning in during cornering, runs on the inside until the center of steering defined by the steered wheels moves between the steered wheels and the wheel running on the inside and the vehicle transitions into a revolving motion. "Disengaged" should be understood as meaning that the previously driven wheel is no longer acted on by a drive torque. This can be achieved in the case of an electric motor drive, for example, by reducing or interrupting the supply voltage, and can be achieved in the case of a hydraulic drive by reducing or interrupting the supply of hydraulic fluid. A switchable freewheel mechanism might alternatively be provided which disengages the wheel from the drive device when reaching the steering angle.

Due to the disengaging of the wheel initially running on the inside during cornering when reaching the specific steering angle, a scraping of the wheels on the ground, which would increase the wear and tear of the wheels and could result in uncontrollable travel states of the industrial truck, is indeed avoided. Applied use has revealed, however, that the disengaging carried out when reaching the specific steering angle can result in an undesirable and noticeable jerking of the vehicle. A sudden acceleration of the revolving motion of the industrial truck when disengaging the wheel initially running on the inside was also noted in some cases.

SUMMARY

An aspect of the present invention is to improve upon the above method for operation of an industrial truck and/or the industrial truck so as to avoid the above-mentioned disadvantages.

In an embodiment, the present invention provides a method for operation of an industrial truck. The industrial truck includes wheels. During a longitudinal travel of the industrial truck, two wheels of the three wheels run in succession and at least approximately in a first lane, and a third wheel of the three wheels runs in a second lane. The two wheels running in the first lane are steerable around respective steering angles. The third wheel running in the second lane initially runs on an inside during a turning in while cornering until the industrial truck, during a further turning in, transitions into a revolving motion. At least one of the two wheels running in the first lane during the longitudinal travel and the third wheel running in the second lane is configured to be acted on by a drive power. The method includes reducing the drive power by a specific amount as of a specific steering angle during the turning in prior to the transitioning into the revolving motion, and disengaging the third wheel initially running on the inside or reversing a direction of a drive rotation of the third wheel after a specified delay time which begins with the reducing of the drive power, or, continuously reducing the drive power from the specific steering angle during the further turning in, and disengaging the third wheel initially running on the inside or reversing the direction of rotation of the third wheel when transitioning into the revolving motion.

BRIEF DESCRIPTION OF THE DRAWINGS

The present invention is described in greater detail below on the basis of embodiments and of the drawings in which.

DETAILED DESCRIPTION

Figure 1:
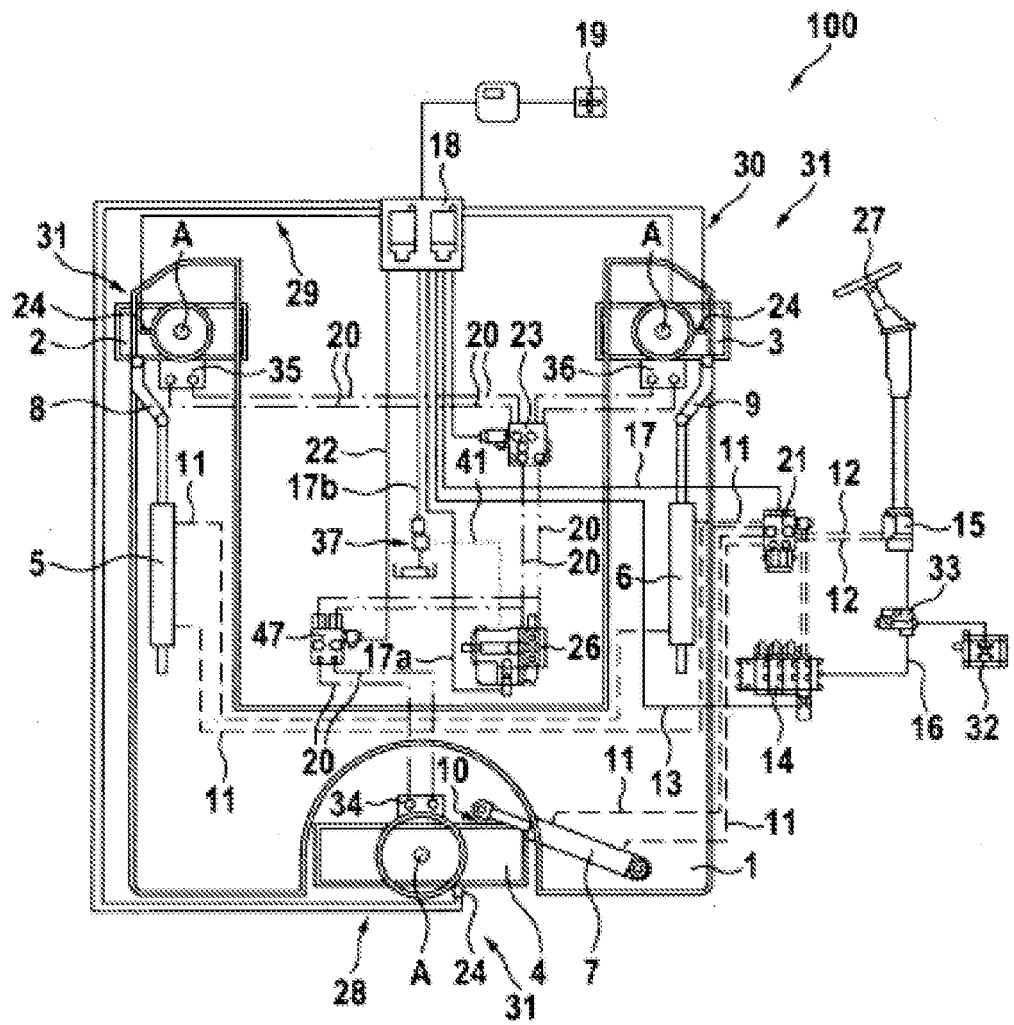
FIG. 1: schematically shows a block diagram of an operating system using the example of a three-wheeled industrial truck during longitudinal travel.

In a first embodiment of the method for operation of the present invention, when turning in, before transitioning into the revolving motion, starting from a specific steering angle, the drive power is reduced by a specific amount and then held at least substantially constant, and subsequently, after a specified delay time from reducing the drive power, the wheel initially running on the inside is disengaged or the direction of rotation of this wheel is reversed.

It has surprisingly been found that a jerking of the vehicle is substantially reduced when compared to the prior art despite the drive power being incrementally changed. The undesirable accelerating when initiating the revolving motion also surprisingly no longer occurs.

In a second embodiment of the method for operation of the present invention, the drive power is continuously reduced, for example, proportionally reduced to the further steering angle change, from the specific steering angle when turning in further, before the wheel initially running on the inside is disengaged or the drive torque under which the drive power acts upon it is reversed. This embodiment achieves an especially "soft" transition of the vehicle from longitudinal travel into a revolving motion.

If the drivable wheels are, for example, driven hydraulically, the hydraulic power of a hydraulic pump provided for driving the drivable wheels can, for example, be reduced or increased to reduce or increase the drive power.

The industrial truck according to the present invention comprises at least two drivable wheels running in different lanes during longitudinal travel, of which at least one is steerable and at least one is initially running on the inside during cornering. A rotational drive device is further provided for the rotational drive of the drivable wheels. This industrial truck also comprises a steering angle detection device for the continuous detecting of the steering angle or for the detecting of a specific steering angle of the at least one steerable wheel, as well as a device for influencing the drive power transmitted from the rotational drive device to the drivable wheels. The device for influencing the drive power can, for example, be connected to the steering angle detection device via a signal line. The drive power can hereby be reduced when turning in during cornering at a specific steering angle. Means for interrupting and/or reversing the drive of the wheel initially running on the inside during cornering are also provided. In an embodiment of the present invention, a time delay device can, for example, be provided via which the means for interrupting and/or reversing the direction of rotation of the drive can be activated after detecting a specific steering angle after a specified delay time. The steering angle detection device can, for example, be connected to the means for interrupting and/or reversing the direction of rotation of the drive therefor. In a second embodiment of the present invention, a line control device can, for example, be provided, with which, after detecting the specific steering angle, the drive power can be continuously reduced and when transitioning into the revolving motion the wheel initially running on the inside or its direction of rotation can be reversed.

In an embodiment of the industrial truck according to the present invention, the rotational drive device can, for example, comprise a power-controllable hydraulic pump and hydraulic motors acting on the drivable wheels, which hydraulic motors can, for example, be acted on with hydraulic medium by the hydraulic pump, which is also called a "travel pump."

The hydraulic pump can, for example, be formed in a power-controllable manner, for example, in a hydraulically power-controllable manner.

A hydraulic control line can, for example, be provided therefor.

For controlling the power of the hydraulic pump, a control spool device which can be switched into the control line via an actuation device may then be provided in the control line, which control spool device is connected to the hydraulic pump for controlling the power.

For reducing the drive power when turning in during cornering at a specific steering angle, a bypass line bypassing the actuation device and connected to the control line may be provided, which bypass line can, for example, comprise a 2/2 solenoid valve and, for example, also a throttle.

The actuation device may additionally or alternatively be connected to the steering angle detection device via a signal line and formed so that the control spool device, as a function of the steering angle, can be continuously, for example, proportionally, acted on by hydraulic control pressure.

The present invention will be explained further below under reference to the drawings.

Figure 2:
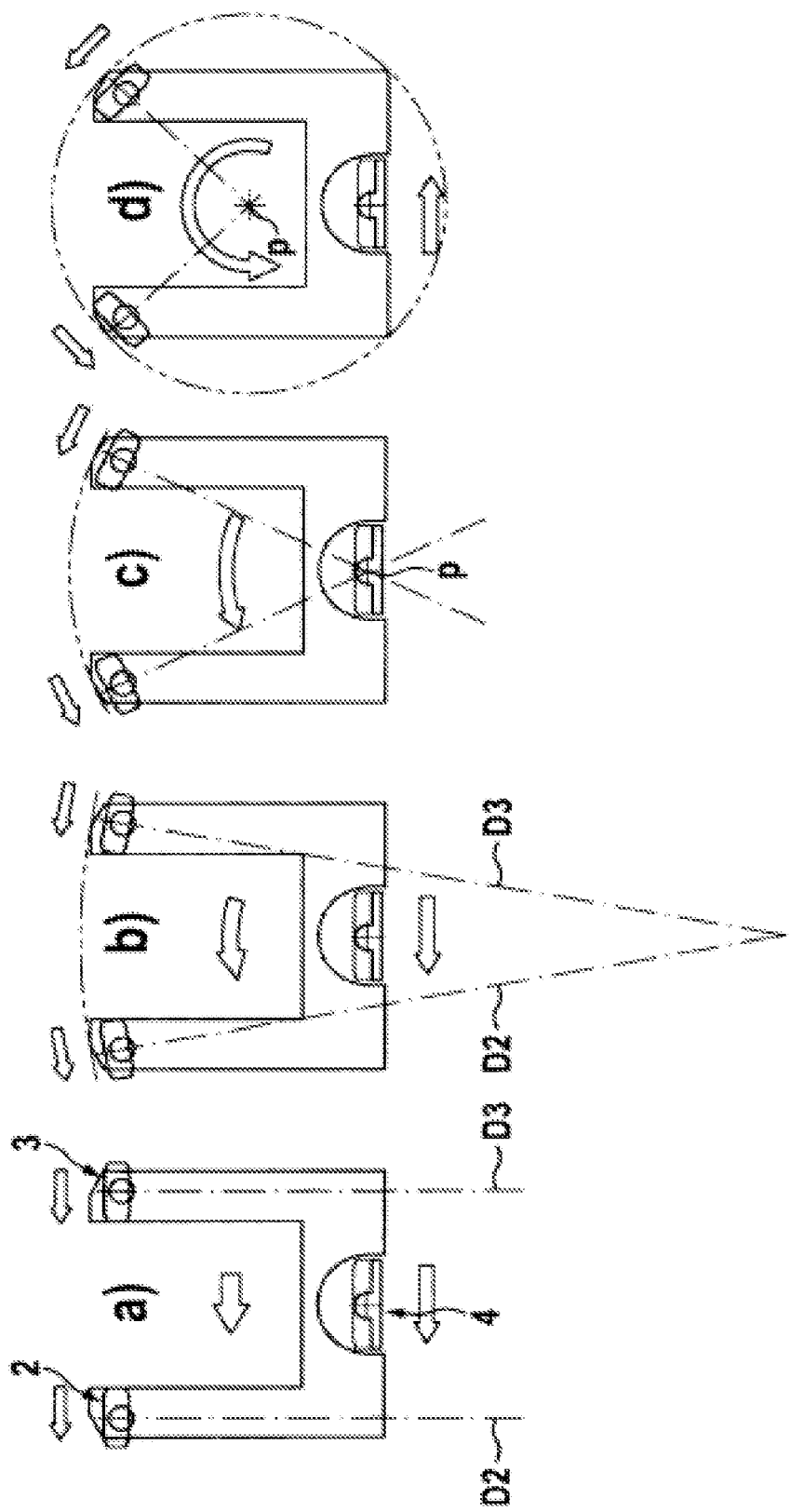
FIG. 2 schematically shows in a)-d) this vehicle in straightforward motion as well as in three different steering situations.

FIGS. 1 and 2 schematically depict a chassis 1 of an industrial truck which is referenced in its entirety as 100. The industrial truck 100 comprises two wheels 2, 3 running in one lane in a longitudinal travel direction, as well as a third wheel 4 running in a second lane. All wheels 2, 3, 4 are arranged in a steerable manner around steering axes A running perpendicularly to the figure plane.

For pivoting of the wheels 2, 3, 4, hydraulic cylinders 5, 6, 7 respectively associated with one of the wheels 2, 3, 4 are provided, which hydraulic cylinders 5, 6, 7 are hinged at one end on the chassis 1 and at the other end on a respective steering arm 8, 9, 10.

Each hydraulic cylinder 5, 6, 7 is connected to a steering block 21 via a hydraulic hose 11. The steering block 21 is a multi-valve location which, as a function of the selected steering program, supplies the hydraulic cylinders 5, 6, 7 with hydraulic fluid. The steering block 21 is connected to a steering orbitrol 15 via hydraulic hoses 12.

The steering orbitrol 15 is further connected with an electrically controllable switching valve 14. The steering orbitrol 15 is connected via an electric signal line 13 to an electric control unit 18 which is formed with a device for storing the longitudinal and lateral travel programs. The switching valve 14 serves the purpose of shifting the wheels 2, 3, 4 as a function of the respective selected drive program to the initial position (with the steering element in neutral position). In FIG. 1, this is the straightforward position during longitudinal travel. If the program "lateral travel" is selected, the switching valve 14 and the steering block 21 make sure that all wheels 2, 3, 4 are pivoted around their respective steering axis A by 90 degrees. The switching valve 14 is also connected via a hydraulic hose 16 to a priority valve 33, to which a hydraulic work pump 32 is connected. The hydraulic work pump 32 serves to provide the hydraulic medium needed to operate the steering and further power units, such as the lifting devices of the industrial truck. The priority valve 33 makes sure that the steering components are preferentially supplied in order to prevent an interruption of the steering function during a simultaneous operation of other power units.

The steering block 21 is also connected via an electric control line 17 with the control unit 18. The feeding or removal of hydraulic fluid via the hydraulic hoses 11 to or from the hydraulic cylinders 5, 6, 7 occurs depending on the travel program, which has been selected with the aid of an input device 19, by a driver. The direction of travel can furthermore be selected via the input device 19.

A hydraulic travel pump 26 is connected to the control unit 18 via an electric control line 17a. The travel pump 26 provides pressurized hydraulic fluid with which hydraulic drive motors 34, 35, 36 can be acted on, each respective hydraulic drive motor 34, 35, 36 being associated with a driven wheel 2, 3, 4. Between the drive motors 34, 35, 36 and the travel pump 26, a travel block 23 closes circuit with the hydraulic hoses, which travel block 23 is likewise connected to the control unit 18 via an electric control line. The travel block 23 distributes the hydraulic flows via hydraulic hoses 20 to the drive motors 35, 36 of the two wheels 2, 3 running in one lane in a longitudinal travel direction according to the respective selected travel program. The drive motor 34 of the third wheel 4 is connected via a shift valve 47 via hydraulic hoses 20 with the travel pump 26. The shift valve 47 is in turn connected via an electric control line 22 to the control unit 18. The travel pump 26 is connected to a valve arrangement 37 via a hydraulic control line 41. The valve arrangement 37 is connected via an electric control line 17b to the control unit 18.

A steering element 27 in the form of a steering wheel serves to operate the steering orbitrol 15.

Angle sensors 24 are provided at all wheels 2, 3, 4, which angle sensors 24 are connected via signal lines 28, 29, 30 with the control unit 18.

Only the two wheels 2, 3 running in one lane are steered during the industrial truck's longitudinal travel according to the present invention. The third wheel 4, also called the "middle wheel," remains unsteered. Lateral travel is symbolized in FIG. 2 *a*) by the depicted arrows. During lateral travel, the center of steering is located in infinity, in other words, the rotational axes D2, D3 of the wheels 2, 3 do not intersect.

If a steering operation to the left occurs, as symbolized in FIG. 2 *b*), the two wheels 2, 3 are rotated in the reverse direction of rotation, albeit in equally large angles, so that the rotational axes D2, D3 intersect at the center of steering P.

The industrial truck 100 travels an arc around the center of steering P, wherein the third wheel 4 must now traverse a smaller path than the two wheels 2, 3. This third wheel 4 hence initially runs on the inside when turning in.

If the steering lock is increased, the center of steering P travels towards the steering axis A of the third wheel 4. Once the center of steering P reaches this steering axis A, as illustrated in FIG. 2 *c*), the industrial truck tends to turn around the steering axis A of the third wheel 4, i.e., to transition into a revolving motion. The third wheel 4 must at that moment stop, if scraping against the ground is to be avoided.

In order to avoid the increased wear and tear linked to a scraping of the wheels on the ground, as well as uncontrolled travel states, the drive power is reduced when turning in before transitioning into the revolving motion from a specific steering angle.

The valve arrangement 37 is provided for this purpose, which valve arrangement 37 is connected to the electric control unit 18 via the control line 17b. In the first embodiment illustrated in FIG. 3, this valve arrangement 37 comprises an actuation device 38 connected to the electric control unit 18. The actuation device 38 is acted on via a hydraulic feed pump 39 with hydraulic medium and serves the deflection of a control spool 40 with the aid of the hydraulic medium against spring tensions acting on the control spool 40 on both sides depending on signals which are transmitted by the electric control unit 18 to the actuation device 38. The control spool 40 is connected to the travel pump 26 on the side of the spool rod. The travel pump 26 is formed so that the flow rate it effectuates depends on the position of the control spool 40.

Figure 3:
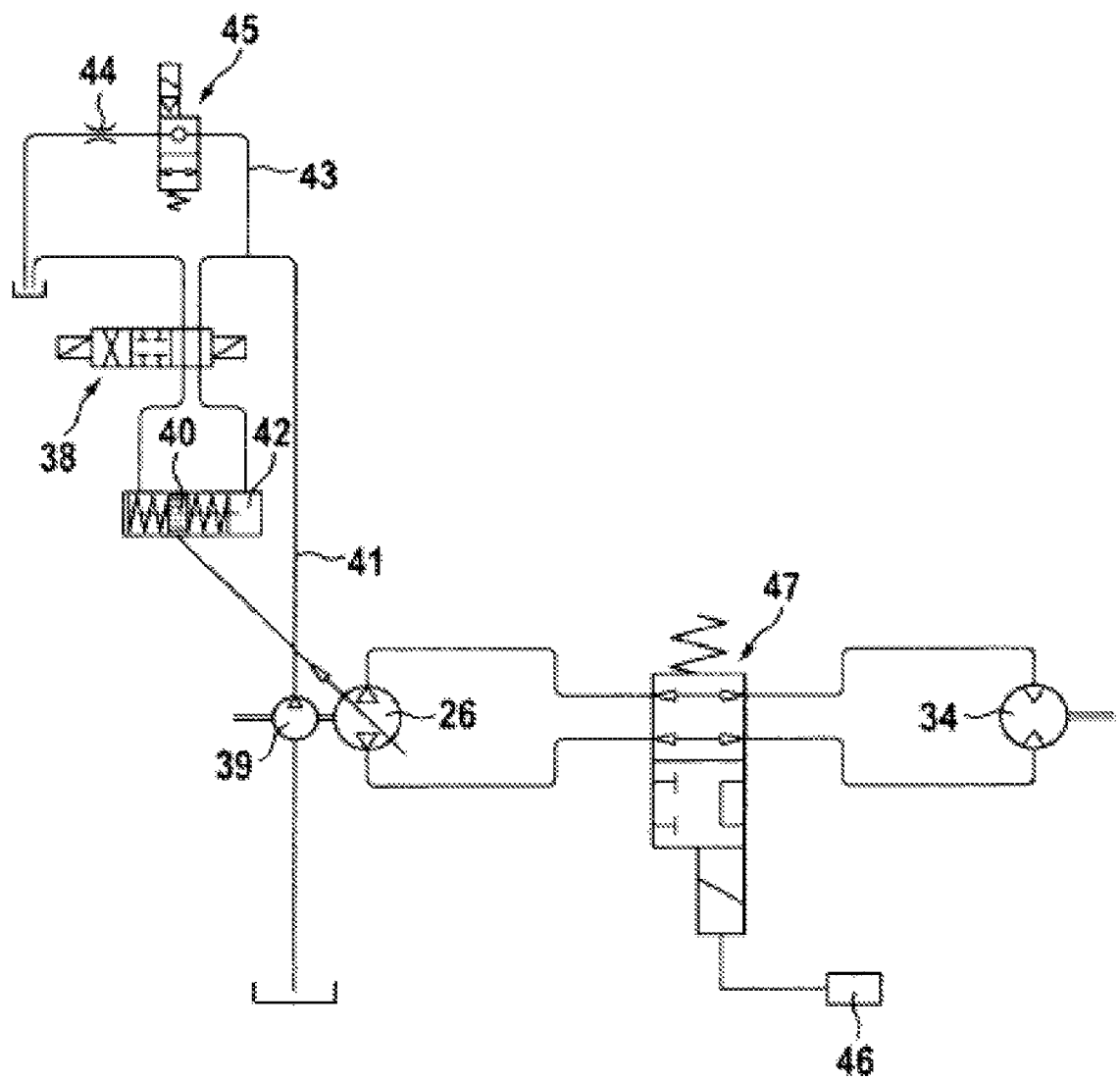
FIG. 3 shows a first embodiment of components intended for driving the wheel initially running on the inside, in the form of a hydraulic circuit diagram.

In FIG. 3 (and also in the further FIGS. 4-6, which show further embodiments described below) the control spool 40 is located in a position shifted from a center neutral position toward the left against the force of a spring tension due to a hydraulic pressure which is generated by the hydraulic feed pump 39 and conveyed via a control line 41 to a cylinder chamber 42, which is illustrated on the right of FIG. 3. If a specific steering angle is now detected when turning in, with the aid of a steering angle detection device 31 operatively connected to, for example, the steered wheel 2, the method according to the present invention (as already described above) provides for reducing the drive power. For this purpose, a bypass 43 connected in parallel to the actuation device is provided in the embodiment illustrated in FIG. 3. The bypass 43 comprises a hydraulic throttle 44 and an electrically operable 2/2 solenoid valve 45 connected in series with the hydraulic throttle 44. The 2/2 solenoid valve 45 is likewise connected to the electric control unit 18 on its operating side.

Figure 4:
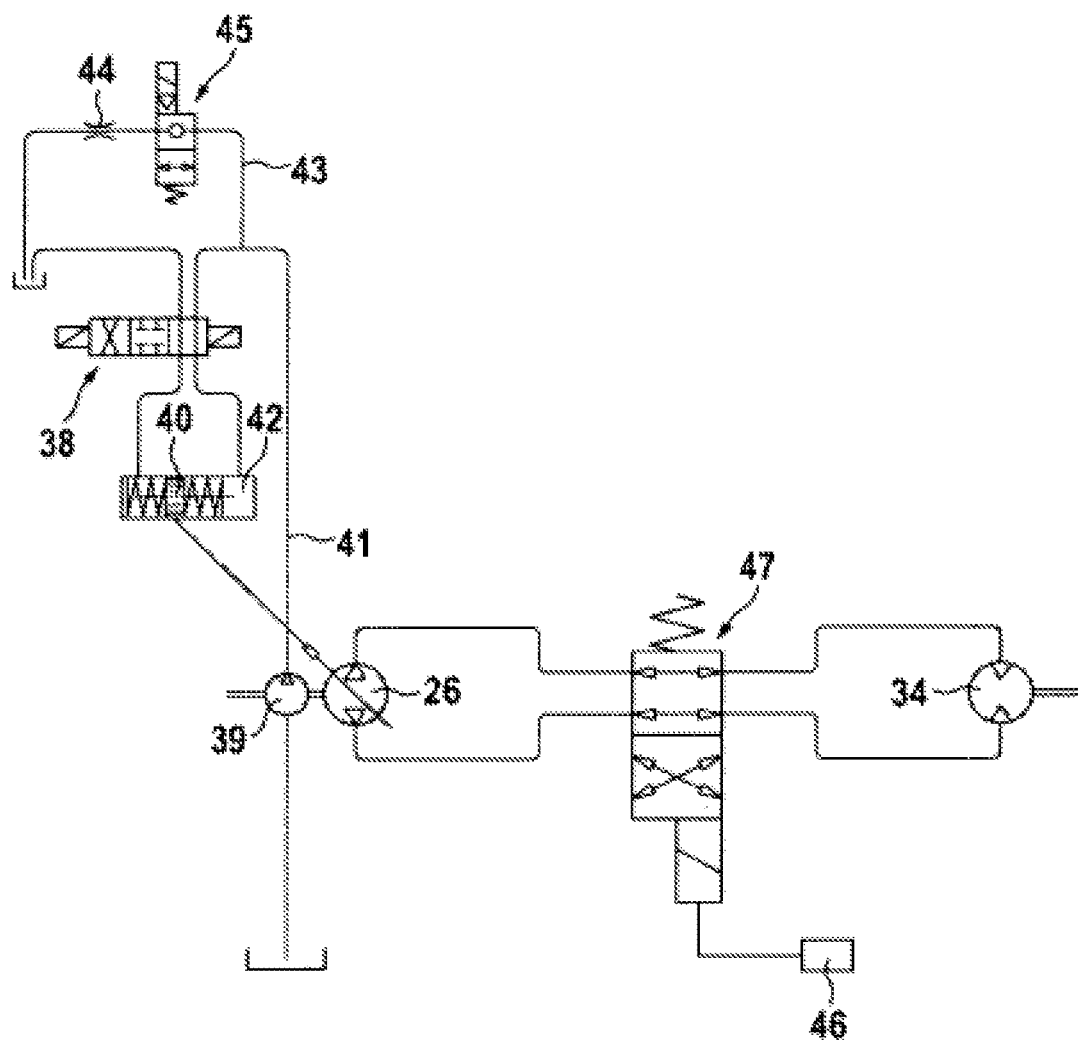
FIG. 4 shows a second embodiment of components intended for driving the wheel initially running on the inside, in the form of a hydraulic circuit diagram.
Figure 5:
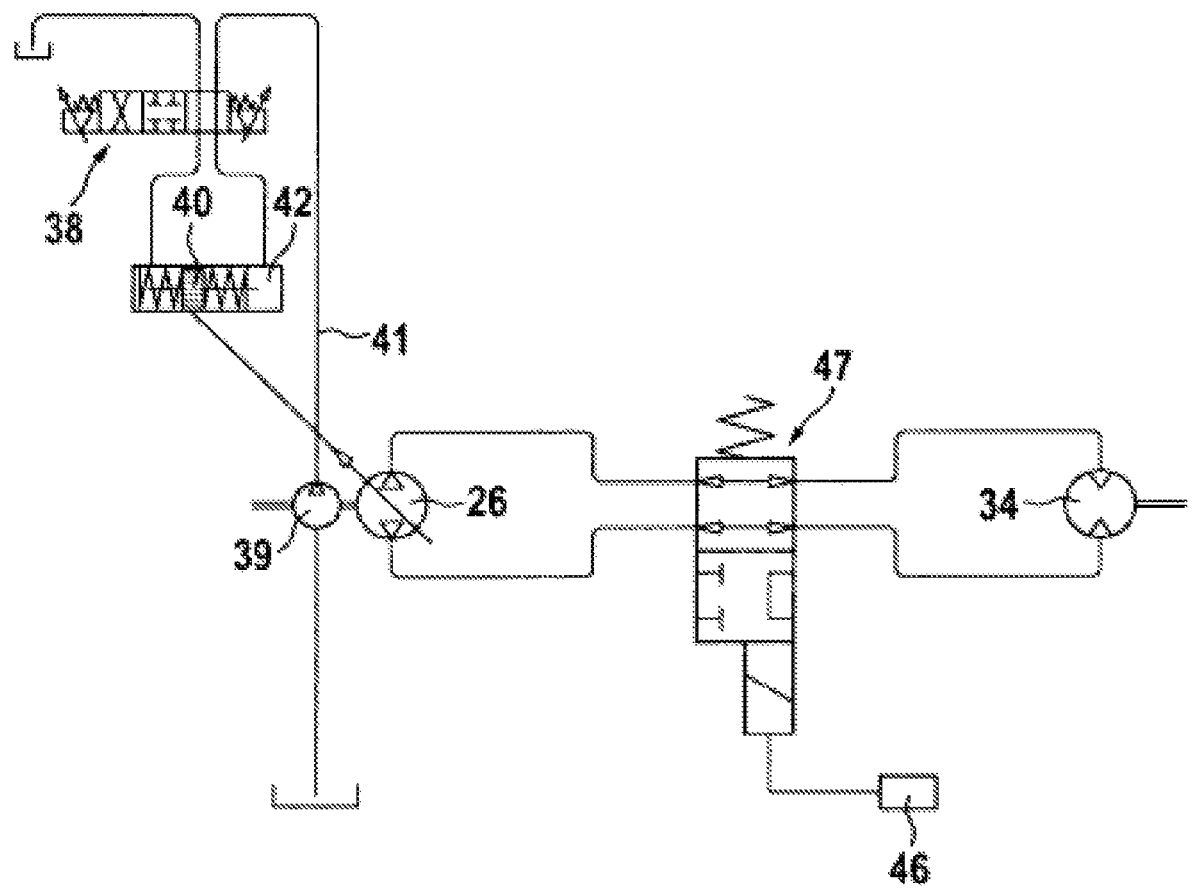
FIG. 5 shows a third embodiment of components intended for driving the wheel initially running on the inside, in the form of a hydraulic circuit diagram.
Figure 6:
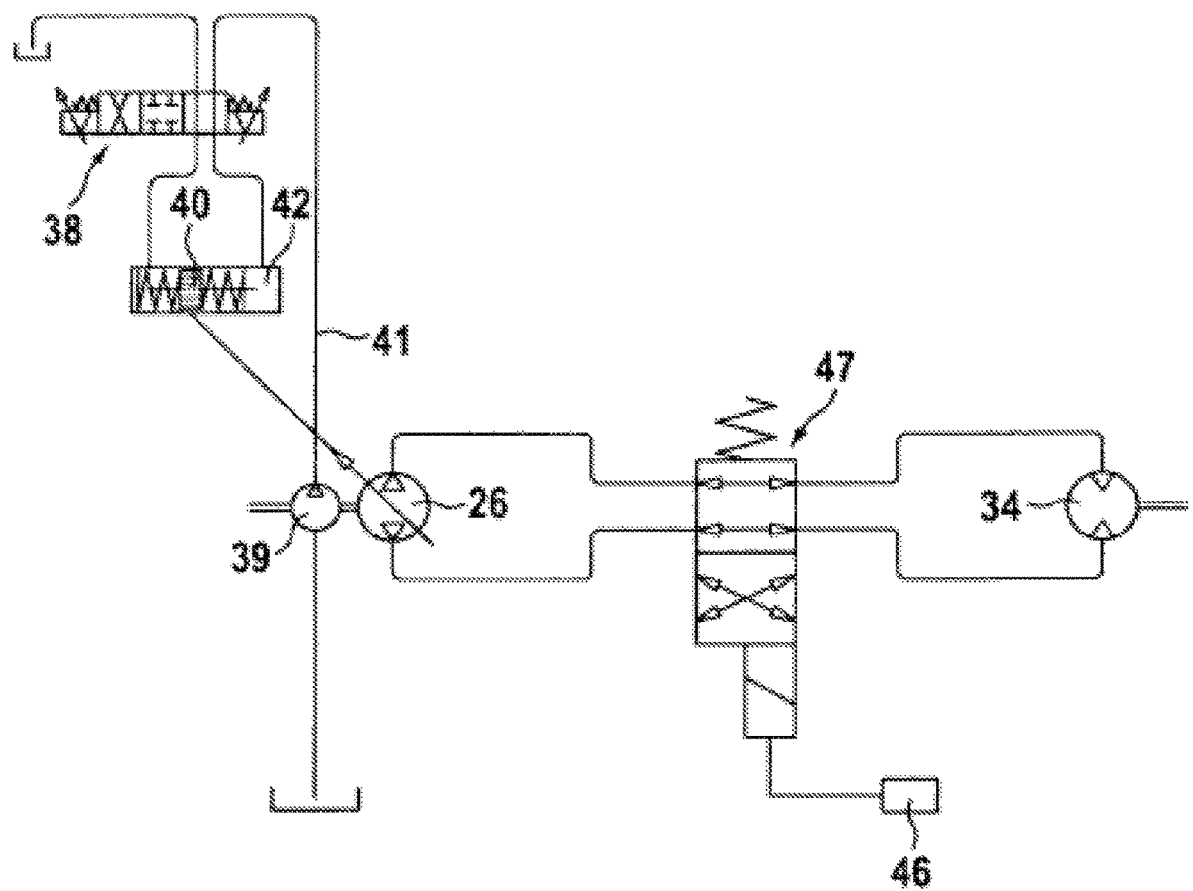
FIG. 6 shows a fourth embodiment of components intended for driving the wheel initially running on the inside, in the form of a hydraulic circuit diagram.

The 2/2 solenoid valve 45 is supplied with a voltage in the operating states illustrated in FIG. 3 and further in FIGS. 4-6. The 2/2 solenoid valve 45 is formed so that it cuts off the flow of fluid through the bypass 43 in this state. The pressure prevailing in the control line 41 is thus applied entirely to the cylinder chamber 42. The travel pump supplies a hydraulic power which is determined by the pressure in the control line 41 and the corresponding position of the control spool 40.

If the 2/2 solenoid valve 45 is now disconnected from current with the aid of the electric control unit 18, which is effectuated in case of detecting the specific steering angle by means of the control unit 18, the bypass 43 is opened and hydraulic medium flows therethrough, overcoming the hydraulic throttle 44. The pressure applied to the control spool 40 in the cylinder chamber 42 hereby drops. The control spool 40, acted on by spring tension, shifts in the direction of the neutral position, whereby the flow rate of the travel pump 26, and thereby the power provided by the drive motors 34, 35, 36, is reduced.

The control unit 18 comprises a time delay device 46. Via the time delay device 46, the shift valve 47, which closes circuit with the hydraulic circuit between the travel pump 26 and the drive motor 34 of the third wheel 4 initially running on the inside when turning in during cornering, is operated by means of the electric control line 22. The shift valve 47 is formed so that it connects the drive motor 34 with the travel pump 26 when it is cut off from voltage. If, after detecting the specific steering angle with the steering angle detection device 31, the shift valve 47 is operated after the delay time has passed, the travel pump 26 in the embodiment illustrated in FIG. 3 is disconnected from the drive motor 34 and the drive motor's hydraulic circuit is short-circuited so that the drive motor 34 can rotate freely and the third wheel 4 thereby runs freely. It is thereby disengaged from the drive. The delay time can be set and adapted to the travel behavior of the respective vehicle. Tests have shown that in the case of three-wheeled industrial trucks of the kind exemplified here, delay times in the range of tenths of a second are regularly suited to improve the travel behavior of these vehicles.

Figure 7:
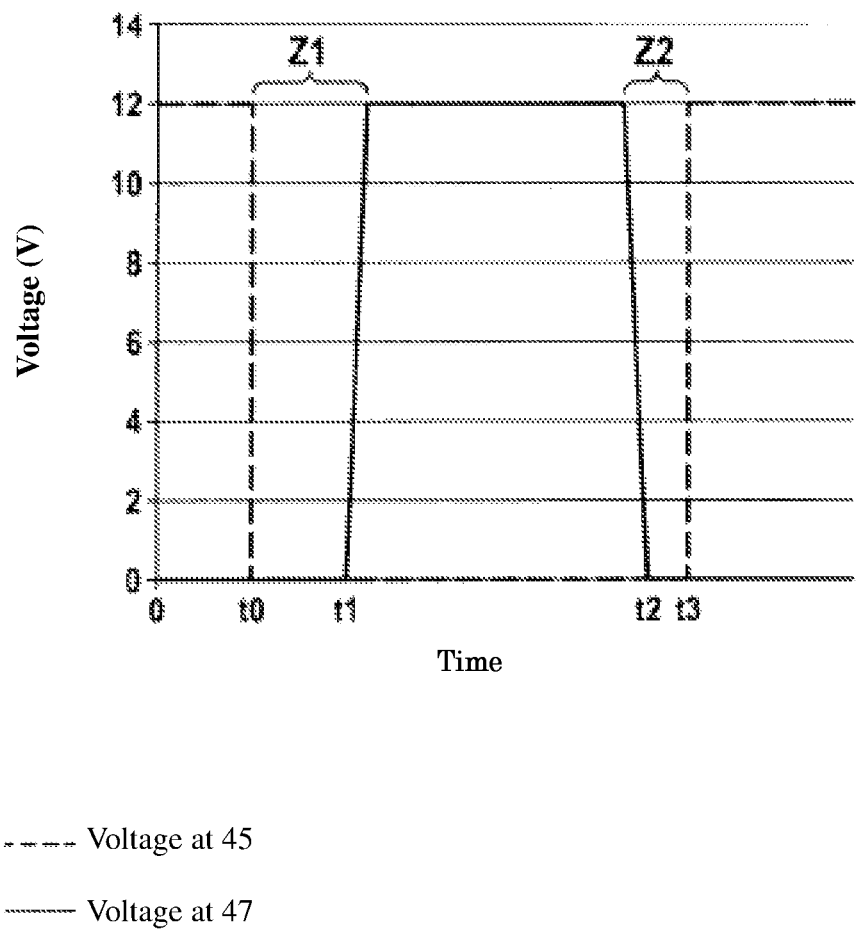
FIG. 7 shows an illustration of a time-delayed activating of a switching valve provided between a travel pump and a hydraulic drive motor of a wheel initially running on the inside when transitioning into a revolving motion.

The time-delayed activation of the 2/2 solenoid valve 45 and of the shift valve 47 is clarified in FIG. 7, which schematically illustrates the course of the voltages applied to these valves. In this case, the voltage applied to the 2/2 solenoid valve 45 is represented by a dotted line and the voltage applied to the shift valve 47 as a function of the time is represented by a continuous line. When turning in from straightforward travel, the confirmation voltage is first applied to the 2/2 solenoid valve 45. The bypass 43 is hence closed and the hydraulic power supplied by the travel pump 26 is hence not reduced. If the steering angle detection device 31 reports reaching a specific steering angle at instant of time t0 to the control unit 18, the 2/2 solenoid valve 45 is cut off from voltage by means of the control unit 18 and, by opening the bypass 43, the hydraulic power supplied by the travel pump 26 is hence reduced. After the delay time Z1 given by the time delay device 46 has passed, the shift valve 47 is supplied with a voltage by means of the control unit 18 at instant of time t1 and the drive motor 34 of the wheel running on the inside is thereby disengaged. The supplying of a voltage, or the disengaging of this wheel, occurs for the duration of the revolving motion. If at instant of time t2 the angle detection device again detects the specific steering angle and thereby the transition from a revolving motion into cornering, the shift valve 47 is again cut off from current. After a delay time Z2, the 2/2 solenoid valve 45 is at instant of time t3 again supplied with a voltage and the reduction of the hydraulic power supplied by the travel pump 26 is thereby reversed.

A second embodiment is illustrated in FIG. 4. It differs from that illustrated in FIG. 3 merely in the respect that the shift valve 47 is formed as a switching valve which, when supplied with a voltage, switches the direction of the hydraulic current conveyed to the drive motor 34. Instead of a disengaging of the third wheel 4, a reversing of its direction of rotation hence occurs in this embodiment.

The third and fourth embodiments illustrated in FIGS. 5 and 6 differ from those explained with regard to FIGS. 3 and 4 first in that no bypass 43 is provided. The actuation device is instead equipped with proportional solenoids and designed so that the hydraulic pressure acting on the control spool is varied beginning with reaching the specific steering angle, proportionally to the further steering angle change. The industrial truck thus steadily delays during further turning in until it transitions into revolving motion. At this moment, in the embodiment illustrated in FIG. 5, a disengaging of the drive motor 34 occurs, and in the embodiment according to FIG. 6, a reversing of the direction of rotation of the drive motor 34 occurs in a manner corresponding to the embodiments according to FIG. 4. Due to the steady delaying of the industrial truck, no time delay and no time delay device is necessary.

The present invention is not limited to embodiments described herein; reference should be had to the appended claims.

LIST OF REFERENCE NUMERALS

100 industrial truck
1 chassis
2, 3 wheels
4 third wheel
5, 6, 7 hydraulic cylinders
8, 9, 10 steering arms
11, 12 hydraulic hoses
13 electric signal line
14 switching valve
15 steering orbitrol
16 hydraulic hose
17, 17a, 17b control line
18 control unit
19 input device
20 hydraulic hoses
21 steering block
22 electric signal line
23 travel block
24 angle sensor
26 travel pump
27 steering element
28, 29, 30 signal lines
31 steering angle detection device
32 hydraulic work pump
33 priority valve
34, 35, 36 drive motors
37 valve arrangement
38 actuation device
39 hydraulic feed pump
40 control spool
41 control line
42 cylinder chamber
43 bypass
44 hydraulic throttle
45 2/2 solenoid valve
46 time delay device
47 shift valve
A steering axis
D2, D3 rotational axes
P center of steering
t0, t1, t2, t3 instant of time
Z1, Z2 delay time

What is claimed is:

1. An industrial truck with three wheels, wherein,
during a longitudinal travel of the industrial truck, two wheels of the three wheels run in succession and at least approximately in a first lane, and a third wheel of the three wheels runs in a second lane, the two wheels being steerable,
the two wheels running in the first lane are steerable around a respective steering angle, and
the third wheel running in the second lane initially runs on an inside during a cornering,
the industrial truck comprising:
a rotational drive device configured to transmit a drive power so as to rotationally drive of at least one of the two wheels running in the first lane during the longitudinal travel and the third wheel running in the second lane, the rotational drive device comprising a power-controllable hydraulic pump/travel pump which is configured to be hydraulically power-controllable;
a steering angle detection device configured to continuously detect the respective steering angles or to detect a specific steering angle of the two wheels;
a device configured to influence the drive power transmitted by the rotational drive device to the two wheels and to the third wheel;
means for interrupting and/or reversing a direction of rotation of the rotational drive device of the third wheel;
a hydraulic control line configured to control a power of the power-controllable hydraulic pump/travel pump, the hydraulic control line comprising a control spool device;
an actuation device;
a signal line configured to connect the actuation device to the steering angle detection device, the signal line being configured so that the control spool device can be continuously acted on by a hydraulic control pressure as a function of the steering angle and so that the control spool device can be proportionally acted on by the hydraulic control pressure as the function of the steering angle; and
a time delay device which is configured, after detecting a specific steering angle after a specified delay time, to activate the means for interrupting and/or reversing a direction of rotation of the drive of the third wheel, or
a power control device which is configured, after detecting a specific steering angle, to continuously reduce the drive power and during a transitioning into a revolving motion, to disengage or to reverse a direction of rotation of the third wheel initially running on the inside,
wherein,
the control spool device may be switched into the hydraulic control line via the actuation device and is connected with the power-controllable hydraulic pump/travel pump for controlling the power.

2. The industrial truck as recited in claim 1, wherein the rotational drive device further comprises a first hydraulic motor which is connected to the third wheel, the hydraulic motor being configured to be acted on by a hydraulic medium via the power-controllable hydraulic pump/travel pump.

3. The industrial truck as recited in claim 2, wherein the rotational drive device further comprises at least one second hydraulic motor which is connected to at least one of the two wheels, the at least one second hydraulic motor being configured to be acted on by the hydraulic medium via the power-controllable hydraulic pump/travel pump.

4. The industrial truck as recited in claim 1, further comprising:
a bypass line which is configured to bypass the actuation device and which is connected to the hydraulic control line.

5. The industrial truck as recited in claim 4, wherein the bypass line comprises a 2/2 solenoid valve.

6. The industrial truck as recited in claim 4, wherein the bypass line comprises a throttle.

\* \* \* \* \*